(12) United States Patent
Addair (10) Patent No.: US 10,063,812 B2
(45) Date of Patent: Aug. 28, 2018

(54) SYSTEMS AND METHODS FOR MEDIA FORMAT TRANSCODING

(75) Inventor: Jennifer Addair, Highlands Ranch, CO (US)

(73) Assignee: DISH Technologies L.L.C., Englewood, CO (US)

( * ) Notice: Subject to any disclaimer, the term of this patent is extended or adjusted under 35 U.S.C. 154(b) by 884 days.

(21) Appl. No.: 12/575,409

(22) Filed: Oct. 7, 2009

(65) Prior Publication Data

US 2011/0083157 A1    Apr. 7, 2011

(51) Int. Cl.

| H04N 7/173 | (2011.01) |
| H04N 21/414 | (2011.01) |
| H04N 21/4143 | (2011.01) |
| H04N 21/4402 | (2011.01) |
| H04N 21/462 | (2011.01) |
| H04N 21/41 | (2011.01) |

(52) U.S. Cl.
CPC ......... *H04N 7/173* (2013.01); *H04N 21/4126* (2013.01); *H04N 21/4143* (2013.01); *H04N 21/41407* (2013.01); *H04N 21/440218* (2013.01); *H04N 21/4621* (2013.01)

(58) Field of Classification Search
CPC ........... H04N 21/4126; H04N 21/4621; H04N 21/4143; H04N 21/41407; H04N 21/440218
USPC ......................................................... 725/120
See application file for complete search history.

(56) References Cited

U.S. PATENT DOCUMENTS

| 6,263,503 B1 | 7/2001 | Margulis |
| 7,647,614 B2 | 1/2010 | Krikorian et al. |
| 7,702,952 B2 | 4/2010 | Tarra et al. |
| 7,707,614 B2 | 4/2010 | Krikorian et al. |
| 7,725,912 B2 | 5/2010 | Margulis |

(Continued)

FOREIGN PATENT DOCUMENTS

| GB | 2 426 651 A | 11/2006 |
| JP | 2005-513831 A | 5/2005 |

(Continued)

OTHER PUBLICATIONS

International Search Report and Written Opinion of the International Searching Authority dated May 25, 2011, for PCT/US2010/050997, 9 pages.

(Continued)

*Primary Examiner* — Michael B Pierorazio
(74) *Attorney, Agent, or Firm* — Seed IP Law Group LLP (57) ABSTRACT

Various embodiments facilitate sharing program content between computing devices that utilize different media formats. In one embodiment, a media format transcoder facilitates content sharing between a receiving device, such as a set-top box, and a content player, the receiving device providing a program as data formatted in a first media format. The media format transcoder obtains from the receiving device the data formatted in the first media format, transcodes the received data into data formatted in a second media format that is compatible with the content player, and causes the content player to present the program by transmitting the transcoded data to the content player. This abstract is provided to comply with rules requiring an abstract, and it is submitted with the intention that it will not be used to interpret or limit the scope or meaning of the claims.

31 Claims, 7 Drawing Sheets

(56) References Cited

U.S. PATENT DOCUMENTS

| | | | |
|---|---|---|---|
| 7,812,854 B1* | 10/2010 | Delker et al. | 348/14.01 |
| 7,877,776 B2 | 1/2011 | Krikorian et al. | |
| 7,886,318 B2* | 2/2011 | Wang | H04N 7/162 380/231 |
| 7,917,932 B2 | 3/2011 | Krikorian | |
| 7,921,446 B2 | 4/2011 | Krikorian et al. | |
| 7,934,239 B1* | 4/2011 | Dagman | 725/86 |
| 7,958,532 B2* | 6/2011 | Paul | H04N 21/234327 348/14.12 |
| 7,992,176 B2 | 8/2011 | Margulis | |
| 8,051,454 B2 | 11/2011 | Krikorian et al. | |
| 8,056,103 B2* | 11/2011 | Candelore | H04N 5/913 375/240 |
| 8,060,909 B2 | 11/2011 | Krikorian et al. | |
| 8,099,755 B2 | 1/2012 | Bajpai et al. | |
| 8,185,927 B2* | 5/2012 | Karaoguz | H04N 21/235 725/105 |
| 8,266,657 B2 | 9/2012 | Margulis | |
| 8,284,082 B2 | 10/2012 | Rao et al. | |
| 8,898,257 B1* | 11/2014 | Basso et al. | 709/219 |
| 2002/0107940 A1* | 8/2002 | Brassil | H04N 21/222 709/219 |
| 2003/0005454 A1* | 1/2003 | Rodriguez | G06Q 30/0601 725/89 |
| 2005/0204393 A1* | 9/2005 | Bopardikar et al. | 725/81 |
| 2005/0254524 A1* | 11/2005 | An | 370/487 |
| 2006/0277576 A1* | 12/2006 | Acharya | H04N 7/17318 725/46 |
| 2007/0033533 A1* | 2/2007 | Sull | G06F 17/30796 715/752 |
| 2007/0157260 A1* | 7/2007 | Walker | H04N 7/163 725/86 |
| 2007/0159368 A1 | 7/2007 | Miyamoto et al. | |
| 2008/0107133 A1 | 5/2008 | Lee | |
| 2008/0263621 A1* | 10/2008 | Austerlitz et al. | 725/139 |
| 2009/0019492 A1* | 1/2009 | Grasset | 725/45 |
| 2009/0172751 A1* | 7/2009 | Aldrey | H04N 7/17318 725/87 |
| 2009/0201988 A1* | 8/2009 | Gazier et al. | 375/240.06 |
| 2009/0207167 A1* | 8/2009 | Pasetto | H04N 13/0059 345/419 |
| 2010/0070608 A1* | 3/2010 | Hosur | 709/218 |
| 2010/0146527 A1* | 6/2010 | Craib et al. | 725/5 |
| 2010/0150245 A1* | 6/2010 | Camp, Jr. | H04N 21/2383 375/240.25 |
| 2010/0303442 A1* | 12/2010 | Newton | H04N 13/0033 386/241 |
| 2010/0313226 A1* | 12/2010 | Cholas et al. | 725/92 |
| 2011/0242284 A1* | 10/2011 | Takigawa | G09G 3/003 348/46 |
| 2011/0246761 A1* | 10/2011 | Alexandrov | 713/150 |
| 2013/0067527 A1* | 3/2013 | Ashbrook | H04N 21/237 725/116 |
| 2013/0131607 A1* | 5/2013 | Ruben | 604/240 |
| 2013/0318629 A1* | 11/2013 | LaJoie et al. | 726/28 |
| 2014/0325578 A1* | 10/2014 | Huang | 725/116 |

FOREIGN PATENT DOCUMENTS

| | | |
|---|---|---|
| JP | 2005-518597 A | 6/2005 |
| JP | 2009-507298 A | 2/2009 |

OTHER PUBLICATIONS

Examination Report in related European Application No. 10 822 447.8-1908; dated Mar. 4, 2015; 5 pages.

Office Action in related Mexican Application No. MX/a/2012/003864 dated Mar. 18, 2014; 3 pages.

Office Action in related Canadian Application No. 2,776,773 dated Mar. 21, 2014; 3 pages.

Bennet et al., "Transcoding Content for Tactical Mobile Computing Devices," *2005 Military Communications Conference* 1:128-132, Oct. 15-17, 2005.

Extended European Search Report, dated Dec. 9, 2013, for corresponding European Application No. 10822447.8, 6 pages.

* cited by examiner

SYSTEMS AND METHODS FOR MEDIA FORMAT TRANSCODING

TECHNICAL FIELD

The technical field relates to media format transcoding and more particularly, to apparatus, systems, and methods for facilitating content sharing between computing devices that utilize differing media formats.

BRIEF SUMMARY

In one embodiment, a content sharing system is provided. The content sharing system includes a media format transcoder configured to: facilitate content sharing between a set-top box and a content player device, the set-top box providing a program as data formatted in a first media format, the set-top box and the content player device each situated remotely from the media format transcoder. The media format transcoder facilitates content sharing by: receiving from the content player device a request for the program; in response to the received request, obtaining from the set-top box the program as data formatted in the first media format; determining a second media format, the second media format being compatible with the content player device; converting the data formatted in the first media format into data formatted in the second media format; and causing the content player device to present the program by transmitting the data formatted in the second media format to the content player device.

In another embodiment, a method in a media transcoder is provided. The method includes facilitating content sharing between a receiving device and a content player, the receiving device providing a program as data formatted in a first media format, by: obtaining from the receiving device the data formatted in the first media format; transcoding the data formatted in the first media format into data formatted in a second media format that is compatible with the content player; and transmitting the data formatted in the second media format to the content player, for presentation by the content player.

In a further embodiment, a method in a media transcoder is provided. The method includes facilitating presentation by a first computing device of a program provided by a second computing device, the program stored on the second computing device as data formatted in a first media format, by: receiving from the first computing device a request for the program; in response to the received request, obtaining from the second computing device the data formatted in the first media format; transcoding the data formatted in the first media format into data formatted in a second media format that is compatible with the first computing device; and transmitting the data formatted in the second media format to the first computing device, such that the second computing device can present the program.

BRIEF DESCRIPTION OF THE DRAWINGS

The components in the drawings are not necessarily to scale relative to each other. Like reference numerals designate corresponding parts throughout the several views.

DETAILED DESCRIPTION

A. System and Environment Overview

Figure 1A:
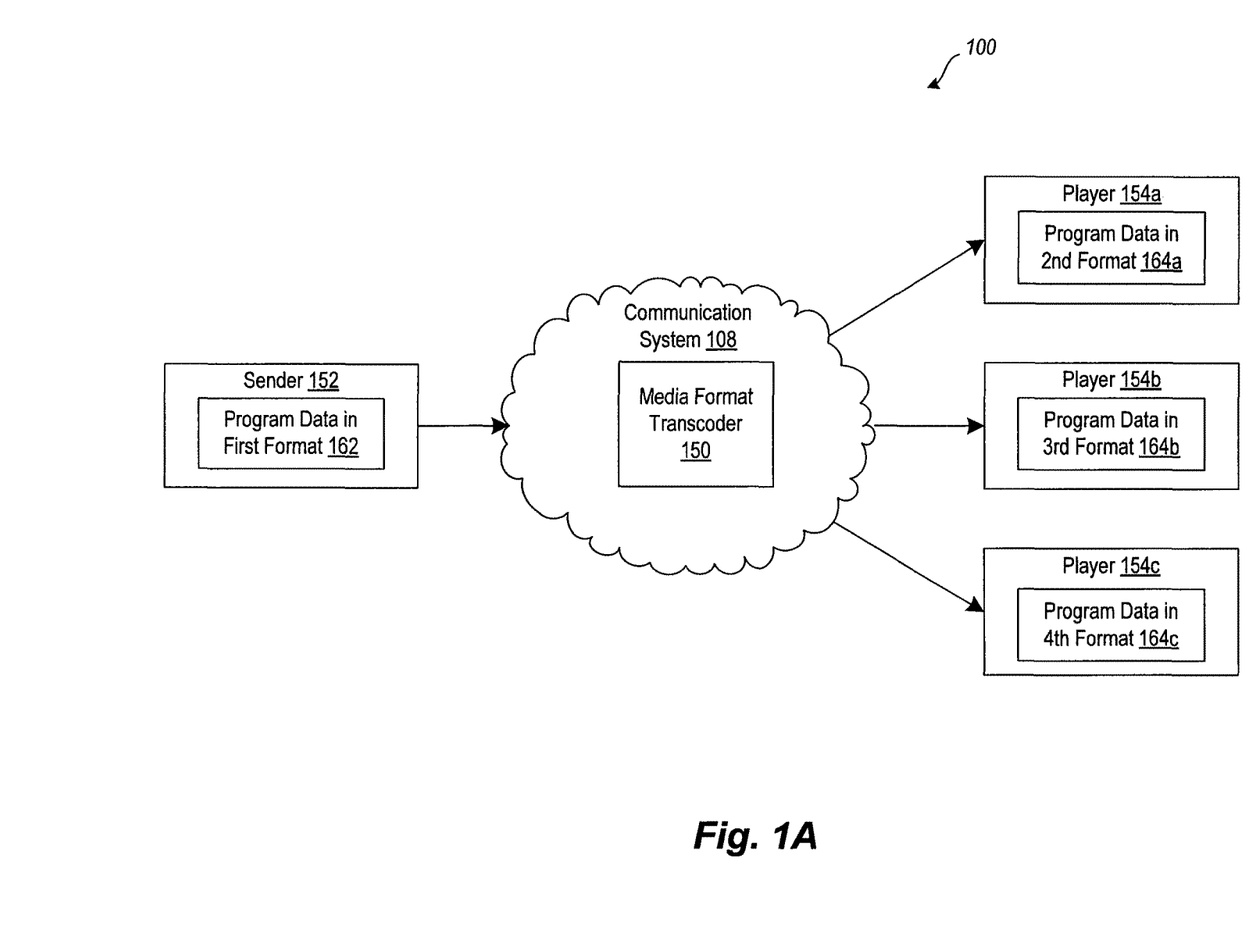
FIG. 1A is a block diagram illustrating functional elements of an example embodiment of a content sharing system.

FIG. 1A is a block diagram illustrating functional elements of an example embodiment of a content sharing system 100. The content sharing system 100 includes a media format transcoder 150, a sender 152, and players 154a-154c, each coupled to a communication system 108. In a typical embodiment, the media format transcoder 150 is remote from the sender 152 and the players 154a-154c. For example, the media format transcoder 150 may operate as a network-accessible computing resource, such as part of a hosted computing system in a data center, as part of a computing "cloud," or the like. The content sharing system 100 facilitates the presentation by the players 154a-154c of an audio/video program that is provided by the sender 152, even when the sender 152 and the players 154a-154c utilize differing media formats to represent the audio/video program. For example, the sender 152 may be configured to provide programs in a first media format, such as MPEG-2, while the players 154a-154c may be configured to display programs in a other media formats, such as MPEG-4, Flash, AVI, or the like. The content sharing system 100 facilitates device compatibility, by providing network-accessible transcoding services for converting audio/video programs from one format into another.

In particular, the media format transcoder 150 facilitates content sharing between the sender 152 and the players 154a-154c, by converting data from a media format utilized by the sender 152 into media formats that are compatible with each of the players 154a-154c. In one embodiment, the media format transcoder 150 receives program data in a first media format 162 from the sender 152. The media format transcoder 150 is configured to transcode (e.g., converts, translates) the data in the first media format into various other media formats, illustrated as program data in a second, third, and fourth media formats 164a-164c, which are respectively compatible with the players 154a-154c. After or during transcoding program data received from the sender 152, the media format transcoder 150 transmits the data in media formats 164a-164c to the players 154a-154c, respectively. The players 154a-154c then present the received data upon a suitable presentation device, such as a video display.

Figure 1B:
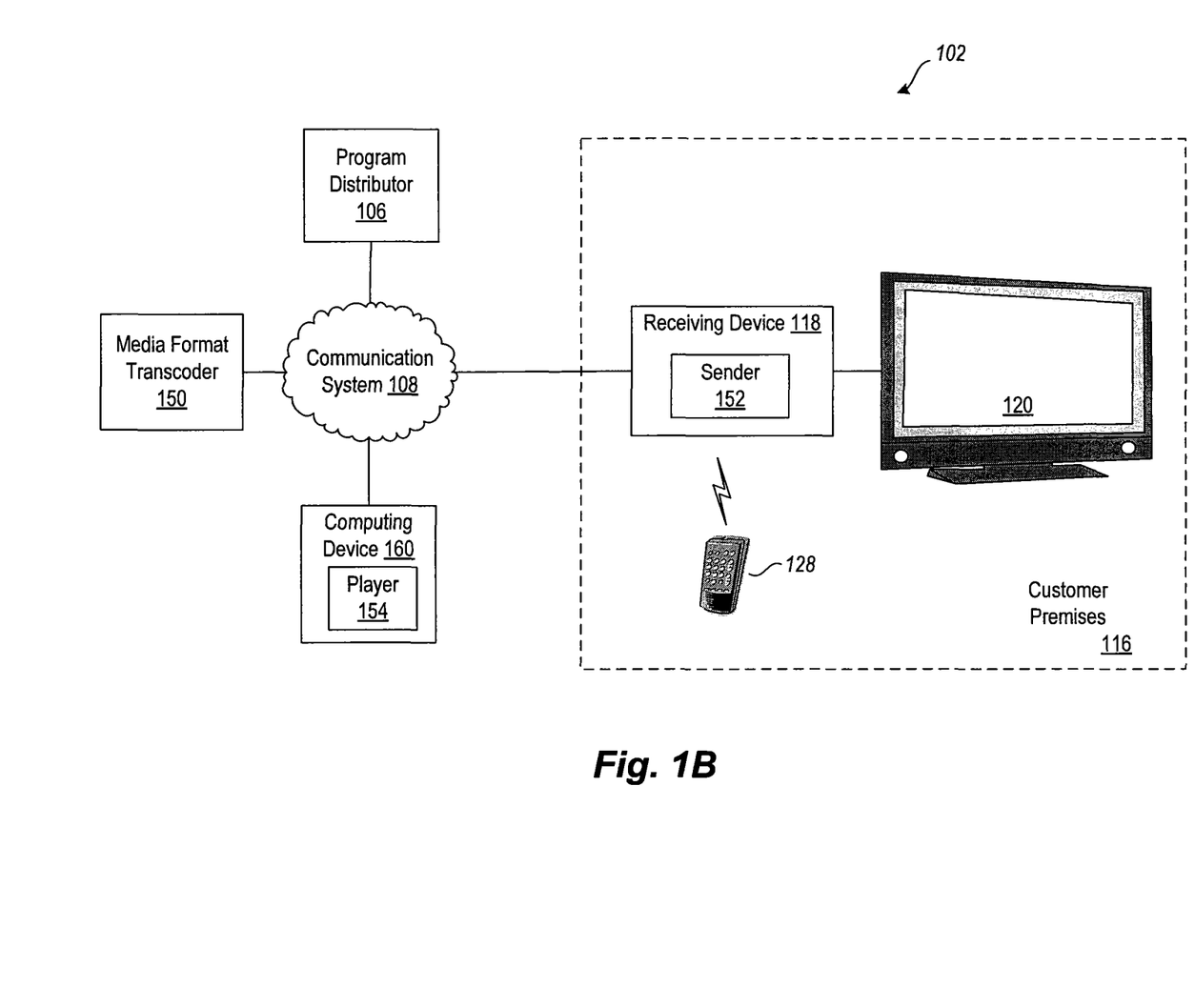
FIG. 1B is a block diagram illustrating an example content distribution environment in which embodiments of a content sharing system may be implemented.

FIG. 1B is a block diagram illustrating an example content distribution environment 102 in which embodiments of a content sharing system may be implemented. In the illustrated embodiment of FIG. 1B, the player 154 is part of a computing device 160, such as a smart phone or laptop computer, while the sender 152 is part of a receiving device 118, such as a set-top box configured to access audio/video programs received from the communication system 108, such as a satellite or cable network. In this example, the media format transcoder 150 is located remotely from the sender 152 and the player 154, such as by executing upon a server computing system located in a data center. In addition the receiving device 118 is located within a customer residence 116, while the computing device 160 may be located remotely from the customer residence 116. Other configurations and arrangements are contemplated, as discussed further below.

The content sharing system allows a user operating the computing device 160 to remotely access program content received by the receiving device 118, without investment in, or installation of, any additional format transcoding hardware/software in the customer residence 118. In particular, the user operating the computing device 160 can request to view a particular program that is received by, or stored upon, the receiving device 118. In response, the sender 152 on the receiving device 118 transmits the requested program as data in a first media format to the media format transcoder 150, where it is converted into data in a second media format, and forwarded to the player 154, for display upon the computing device 116.

Before providing additional details regarding the operation and constitution of the elements of the content sharing system 100, the content distribution environment 102 will be generally described. In the content distribution environment 102, audio, video, and/or data service providers, such as television service providers, provide their customers audio/video/data programming (hereafter, collectively and/or exclusively "programming"). Such programming is often provided by use of a receiving device 118 communicatively coupled to a presentation device 120 configured to receive the programming.

The receiving device 118 interconnects to one or more communications media or sources (such as a cable head-end, satellite antenna, telephone company switch, Ethernet portal, off-air antenna, or the like) that provide the programming. The receiving device 118 commonly receives programming by way of the communications media or sources described in greater detail below. Based upon selection by a user, the receiving device 118 processes and communicates the selected programming to the presentation device 120.

The receiving device 118 may be any suitable converter device or electronic equipment that is operable to receive programming. For convenience, the receiving device 118 may be interchangeably referred to as a "television converter," "receiver," "set-top box," "television receiving device," "television receiver," "television recording device," "satellite set-top box," "satellite receiver," "cable set-top box," "cable receiver," "media player," and/or "television tuner." Further, the receiving device 118 may itself include user interface devices, such as buttons or switches. In many applications, the remote-control device ("remote") 128 is operable to control the receiving device 118 and/or the presentation device 120. The remote 128 typically communicates with the receiving device 118 using a suitable wireless medium, such as infrared ("IR"), radio frequency ("RF"), or the like.

Examples of the presentation device 120 include, but are not limited to, a television ("TV"), a personal computer ("PC"), a sound system receiver, a digital video recorder ("DVR"), a compact disk ("CD") device, game system, or the like. Presentation devices 120 employ a display, one or more speakers, and/or other output devices to communicate video and/or audio content to a user. Typically, one or more presentation devices 120 reside in a customer's premises 116 and are communicatively coupled to the receiving device 118. In some instances, the receiving device 118 and the presentation device 120 may be integrated into a single device.

A content provider (not shown) provides program content, such as television content or audio content, to the program distributor 106. Example content providers include television stations which provide local or national television programming, special content providers which provide premium based programming or pay-per-view programming, radio stations which provide audio programming, or the like.

Program content, interchangeably referred to as a program, is communicated to the program distributor 106 from the content provider 104 through suitable communication media, generally illustrated as communication system 108 for convenience. Communication system 108 may include many different types of communication media or protocols, including telephony systems, the Internet, internets, intranets, cable systems, fiber optic systems, microwave systems, asynchronous transfer mode ("ATM") systems, frame relay systems, digital subscriber line ("DSL") systems, radio frequency ("RF") systems, and satellite systems.

Programs may be communicated to the receiving device 118 in various ways. In one embodiment, programs are transmitted from the program distributor 106 to the receiving device 118 at least in part via a cable network that carries program data encoded as analog and/or digital signals. Such signals may contain a plurality of multiplexed (e.g., time division multiplexed) programs that are organized into distinct logical or physical channels. In another embodiment, the program distributor 106 transmits programs to the receiving device 118 via an Internet Protocol ("IP") network established over wire-based and/or wireless communication media. In other embodiments, the program distributor 106 transmits programs to the receiving device via a satellite network, comprising an uplink antenna, a satellite, and a receiver antenna coupled to the receiving device 118. In another embodiment, the receiving device 118 is coupled to an "over-the-air" ("OTA") broadcast antenna that is configured to receive a program signal from a terrestrial based transmitter, such as broadcast transmit tower.

The receiving device 118 processes, via an audio/video processor or similar component, a received program signal into a signal and/or format suitable for communication to a presentation device 120 or another device, such as a digital video recorder or a home computing system. Processing a received program signal may include demodulating, decompressing, decoding, decrypting, or similar operations to access program data that is encoded upon the received signal. Processing the received program signal may also include operations for making program data suitable for presentation upon another device, including translating the program data from one format into another, and re-encoding the converted program data upon an output signal, and the like.

In an example content sharing system implemented within environment 102, the media format transcoder 150 interacts via the communication system 108 with the player 154 and the sender 152. In the illustrated embodiment, the sender 152 is shown operating upon the receiving device 118. In addition, the player 154 is shown operating upon the computing device 160, which is typically a portable computing device capable of displaying audio/video content, such as a cellular telephone, smart phone, PDA, laptop computer, personal media player, or the like. The media format transcoder 150 provides transcoding services to the sender 152 and the player 154, such that a user can view programming received by the receiving device 118 on the computing device 160, without the need for any additional format transcoding hardware within the customer premises 116.

In the example of FIG. 1B, the computing device 160 is remote from the customer premises 116. However, the computing device 160 could instead be located within customer premises 116. More specifically, in another embodiment, the computing device 160 is a consumer electronics device, such as a television, digital video recorder, audio system, or the like, situated in the customer premises 116. In addition, the sender 152 can operate upon devices other than the receiving device 118, such as a personal computer or digital video recorder. The media format transcoder 150 provides transcoding services to these devices of the customer premises 116, such that program content provided by the sender 152 operating on a first device, can be presented by the player 154 operating on second device, without the need for additional format transcoding hardware within the customer premises 116.

The above description of the content distribution environment 102 and the customer premises 116, and the various devices therein, is intended as a broad, non-limiting overview of an example environment in which various embodiments of a content sharing system may be implemented. FIG. 1B illustrates just one example of a content distribution environment 102 and that the various embodiments discussed herein are not limited to such environments. In particular, content distribution environment 102 and the various devices therein, may contain other devices, systems and/or media not specifically described herein.

Example embodiments described herein provide applications, tools, data structures and other support to implement a content sharing system that facilitates content sharing between devices that utilize differing media formats. Other embodiments of the described techniques may be used for other purposes or contexts, such as for data format translation purposes generally. In the following description, numerous specific details are set forth, such as data formats, code sequences, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

B. System Interactions

Figure 2:
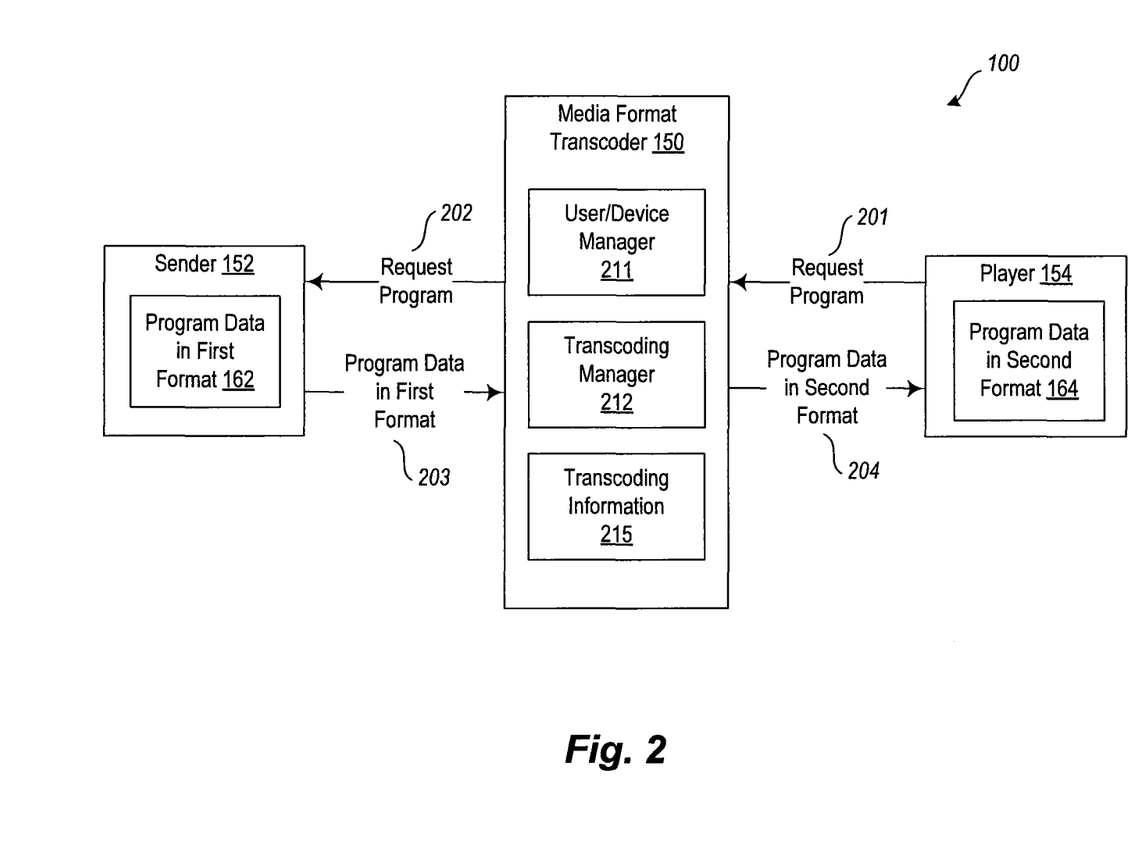
FIG. 2 is a block diagram illustrating interactions between elements of an example embodiment of a content sharing system.

FIG. 2 is a block diagram illustrating interactions between elements of an example embodiment of a content sharing system. The illustrated content sharing system 100 includes a sender 152, a player 154, and a media format transcoder 150. The media format transcoder 150 includes a user/device manager 211, a transcoding manger 212, and transcoding information 215.

The user/device manager 211 facilitates interactions between users and devices that are part of the content sharing system 100. In particular, the user/device manager 211 receives information about users and/or devices, and stores such information as transcoding information 215, as described below. In addition, the user/device manager 211 receives a request from the player 154 for a program, and services that request by determining a sender (e.g., source) for the requested program, an expected or preferred media format utilized by the player 154, and other information needed to facilitate the sharing of the program with the player 154.

The transcoding manager 212 converts data from one media format to another. In particular, the transcoding manager 212 is configured to convert program data from one of multiple media formats into another of multiple media formats. Media formats include data layout and/or encoding formats for representing audio, still images, and video data. Example media formats include, but are not limited to, video formats such as MPEG-1, MPEG-2, MPEG-4, Flash, QuickTime, Windows Media, AVI, 3GP, H.261, H.263, H.264, and the like; audio formats such as AC3, WMA, MP3, MP4, PCM, WAV, AAC, FLAG, and the like; and image formats such as GIF, JPEG, TIFF, PNG, BMP, and the like.

The transcoding information 215 includes information about various users, senders, players, and associated devices that are part of the content sharing system 100. In a typical arrangement, the transcoding information 215 includes an association between the sender 152 and the player 154. In general, for a given player, the transcoding information 215 may associate one or more senders that are authorized to provide programs to the player. In addition, for each sender or player, the transcoding information 215 may include identifiers and/or location information, such as a logical identifier (e.g., network name), a hardware identifier (e.g., MAC address), a network address (e.g., IP address), uniform resource identifier ("URI"), or the like. The transcoding information 215 may also include access control information associated with users, players, or senders, including passwords, access keys (e.g., public/private keys, shared keys), and the like. Furthermore, the transcoding information 215 may include, for each player or sender, computing resource and/or configuration information, including compatible media formats (e.g., MPEG-2, MPEG-4), network bandwidth, processor class/speed, storage capacity, and the like. Also, the transcoding information 215 may include, for each sender, a list or index of programs that are available or otherwise provided by that sender.

In interaction 201, the player 154 requests a program that is to be displayed by the player 154. The request is transmitted to the media format transcoder 150, where the user/device manager 211 determines a suitable source, such as sender 152, for the requested program. Determining the source of a requested program includes processing the transcoding information 215. By referencing the transcoding information 215, the user/device manager 211 determines that the sender 152 is the appropriate source for the requested program, such as because the sender 152 is installed upon a set-top box associated with the user of the player 154, and because the set-top box is authorized to access the requested program.

In interaction 202, the media format transcoder 150 requests the program from the sender 152. In response to receiving the request, the sender 152 obtains the program as data in a first format 162. In some cases, the data in the first format 162 is stored upon the sender 152, such as in a storage device that is part of a digital video recorder or receiving device on which the sender 152 operates. In other cases, the data in the first format 162 is dynamically obtained by the sender 152, such as by being received from a satellite or cable broadcast network coupled to a receiving device on which the sender 152 operates. In such cases, the data in the first format 162 may be retained only transiently by the sender 152, such as long enough to receive a portion of the data (e.g., one or more MPEG frames) and then transmit the received portion onwards to the media format transcoder 150.

In interaction 203, the sender 152 transmits to the media format transcoder 150 the data in the first media format 162.

The sender 152 may transmit the data in the first media format 162 in substantially real time, such as when the sender 152 is accessing the program as a "live" program stream, such as may be received from a satellite network. In other cases, such as when the sender 152 is accessing the program as stored data upon a receiving device, the sender 152 may transmit the data in the first media format 162 in faster than real time, based on available network bandwidth between the sender 152 and the media format transcoder 150.

In response to receiving the data in the first media format 162, the media format transcoder 150 converts the received data into data in a second media format. In particular, the transcoding manager 212 first determines a second media format compatible with the player 154. In one embodiment, the transcoding manger 212 makes this determination by processing the transcoding information 215, which identifies one or more media formats that are compatible with the player 154. In another embodiment, the player 154 specifies a preferred media format as part of the initial program request of interaction 201, or as part of some other network interaction.

After determining the second media format, the transcoding manager 212 begins transcoding the received data in the first media format 162 into data in the second media format, which may be stored, at least temporarily in the media format transcoder 150, prior to its transmission. Transcoding the received data may include various operations to access the data, such as decompression and/or decryption. In some cases, the sender 152 transmits the data in the first format 162 in encrypted (e.g., scrambled) form, and the media format transcoder 150 uses a decryption key associated with the sender 152, player 154, and/or an associated user, to decrypt the received data. Transcoding the received data may also include encrypting the data in the second media format, for example to provide access to the player 154, while restricting access by unauthorized systems.

In interaction 204, the media format transcoder 150 transmits to the player 154 the program as the data in the second media format 164. As the transcoding manager 212 begins to convert the data in the first media format 162 into the data in the second media format, the media format transcoder 150 can begin transmitting the data in the second media format 164 to the player 154. The data in the second media format 164 is in some cases streamed in or about real time to the player. In other cases, the data in the second media format 164 is transmitted in faster than real time.

The player 154 then presents the requested program, based on the received data in the second media format 154. Typically, the player 154 stores, at least temporarily, the received data in the second media format 164, such as by buffering the received data for presentation purposes. The player 154 performs various operations related to program presentation, including decryption, decoding, decompression, rendering, error correction, and the like.

Variations on the above-described interaction scheme are contemplated. For example, in one embodiment, the initial request described in interaction 201 does not involve the media format transcoder 150. In such an embodiment, the player 154 transmits the program request directly to the sender 152. In response, the sender 152 notifies the media format transcoder 150 of the request and/or begins transmitting program data to the media format transcoder 150.

In addition, various additional interactions may occur before, during, or after the above-described interactions. For example, in one embodiment, the illustrated components 150, 152, and 154 engage in or otherwise perform various device discovery operations. Device discovery generally includes any operation that provides or updates the transcoding information 215 or any other information that guides or controls interactions between the components 150, 152, and 154. Device discovery includes registering a device as being authorized to view programming provided by a sender device. For example, the player 154 may be registered with the media format transcoder 150 as a device that is authorized to view programming provided by the sender 152. Device discovery also includes informing the media format transcoder 150 about the characteristics and/or configuration of a device. For example, the player 154 may notify the media format transcoder of 150 of its available network bandwidth, its processor class/speed, its preferred media format(s), and the like. Device discovery also includes informing the media format transcoder 150 about the programming provided by a device. For example, the sender 152 may notify the media format transcoder 150 of one or more programs that are provided by (e.g., stored upon, received by) the sender 152 for viewing on the player 154.

Furthermore, the media format transcoder 150 may include a media cache in order to reduce the number of transcoding operations performed. In one embodiment, the media format transcoder 150 may cache (e.g., store) the program data in one or both of the first and second media formats 162 and 164, such that a subsequent request for the program in one of those media formats may be served without needing to again receive and transcode the program data. In some embodiments, every requested program is cached, in both the first and second media formats 162 and 164, until a cache limit (e.g., cache storage capacity) is reached. When the cache is full, various replacement policies can be utilized, including least recently used/accessed, random, round-robin, or the like.

C. Example Computing System Implementation

Figure 3:
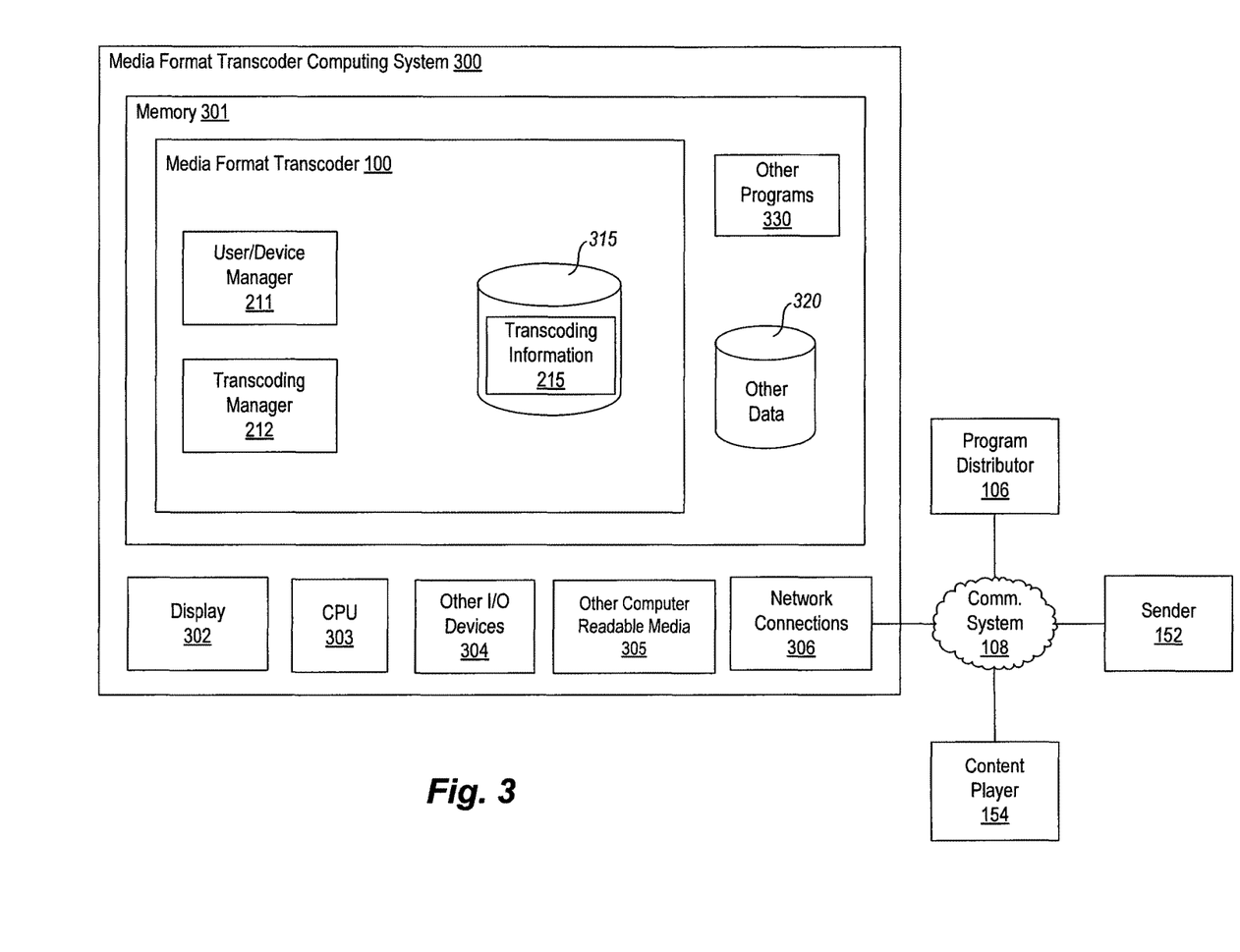
FIG. 3 is a block diagram of a computing system for implementing elements of an example embodiment of a content sharing system.

FIG. 3 is a block diagram of a computing system for implementing elements of an example embodiment of a content sharing system. FIG. 3 shows a computing system 300 that may be utilized to implement a media format transcoder 100. In one embodiment, the computing system 300 is a server computing system that is located in a data center and that provides transcoding services for devices of multiple users. In another embodiment, the computing system 300 is located in customer premises 116 and provides transcoding services to devices of the customer.

Note that one or more general purpose or special purpose computing systems/devices may be used to implement the media format transcoder 100. In addition, the computing system 300 may comprise one or more distinct computing systems/devices and may span distributed locations. Furthermore, each block shown may represent one or more such blocks as appropriate to a specific embodiment or may be combined with other blocks. Also, the media format transcoder 100 may be implemented in software, hardware, firmware, or in some combination to achieve the capabilities described herein.

In the embodiment shown, receiving device computing system 300 comprises a computer memory ("memory") 301, a display 302, one or more Central Processing Units ("CPU") 303, Input/Output devices 304 (e.g., audio processor, video processor, keyboard, mouse, CRT or LCD display, and the like), other computer-readable media 305, and network connections 306. The media format transcoder 100 is shown residing in memory 301. In other embodiments, some portion of the contents, some of, or all of the components of the media format transcoder 100 may be stored on and/or transmitted over the other computer-readable media 305. The components of the media format transcoder 100 preferably execute on one or more CPUs 303 and facilitate program sharing, as described herein. Other code or programs 330 (e.g., an administrative interface, a Web server, and the like) and potentially other data repositories, such as data repository 320, also reside in the memory 301, and preferably execute on one or more CPUs 303. Of note, one or more of the components in FIG. 3 may not be present in any specific implementation. For example, some embodiments may not provide other computer readable media 305 or a display 302.

In a typical embodiment, the media format transcoder 100 includes a user/device manager 211, a transcoding manager 212, and a data repository 315 that includes transcoding information 215. The user/device manager 211, the transcoding manager 212, and transcoding information 215 are described with respect to FIG. 2, above.

The media format transcoder 100 interacts via the communication system 108 with the sender 152 and the player 154, as discussed with respect to FIGS. 1A, 1B, and 2. In addition, the media format transcoder 100 may interact via the communication system 108 with the program distributor 106, such as in order to obtain information about users and/or devices that are authorized to view particular programs, to obtain information about devices (e.g., compatible and/or preferred media formats).

Other or additional functions and/or data are contemplated. For example, the user/device manager 211 may provide a user interface comprising a view and a controller that facilitate user interaction with the media format transcoder 100 and its various components. For example, the user interface manager 211 may provide a graphical user interface that may be utilized by a user in order to establish an account, register a device (e.g., sender 152 or player 154), and the like. The user interface may be implemented as a Web page provided via a Web server, executing as one of the other programs 330.

In addition, some embodiments include a transcoding application program interface ("API") that provides programmatic access to one or more functions of the media format transcoder 100. For example, the transcoding API may provide a programmatic interface to one or more transcoding or device management functions of the media format transcoder 100 that may be invoked by one of the other programs 330 or some other module. In this manner, the transcoding API may facilitate the development of third-party software, such as user interfaces, plug-ins, adapters (e.g., for integrating functions of the media format transcoder 100 into desktop applications), and the like.

In addition, the transcoding API may be in at least some embodiments invoked or otherwise accessed via remote entities, such as the program distributor 106, sender 152, and/or player 154, to access transcoding or device management functionality of the media format transcoder 100. For example, the program distributor 106 may periodically upload customer information via the transcoding API to provide the media format transcoder 100 with a list of customers that are authorized to use services of the media format transcoder 100. As another example, the player 154 may register, via the transcoding API, itself and its configuration (e.g., preferred media format) with the media format transcoder 100. As a further example, the sender 152 may provide, via the transcoding API, program data to be transcoded for display by the player 154.

Also, the data repository 315 (or some other data repository) may be utilized to implement a media cache, such that certain programs may be provided directly, without first needing to be obtained and transcoded by the media format transcoder 100. In some embodiments, multiple media format transcoders located at a common site (such as a data center) can cooperate to provide a distributed media cache that includes a greater number of programs than could efficiently be stored by a single media format transcoder 100.

In an example embodiment, components/modules of the media format transcoder 100 are implemented using standard programming techniques. For example, the media format transcoder 100 may be implemented as a "native" executable running on the CPU 303, along with one or more static or dynamic libraries. In other embodiments, the media format transcoder 100 may be implemented as instructions processed by a virtual machine that executes as one of the other programs 330. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), declarative (e.g., SQL, Prolog, and the like).

The embodiments described above may also use well-known or proprietary synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported by a media format transcoder implementation. Also, other functions could be implemented and/or performed by each component/module, and in different orders, and by different components/modules, yet still achieve the functions of the media format transcoder.

In addition, programming interfaces to the data stored as part of the media format transcoder 100, such as in the data repository 315, can be available by standard mechanisms such as through C, C++, C#, and Java APIs; libraries for accessing files, databases, or other data repositories; through scripting languages such as XML; or through Web servers, FTP servers, or other types of servers providing access to stored data. The data repository 315 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of a media format transcoder.

Furthermore, in some embodiments, some or all of the components of the media format transcoder 100 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

The illustrated program distributor 106, sender 152, and player 154 may also be implemented using techniques similar to those described above. That is, each of the program distributor 106, sender 152, and player 154 may comprise one or more computing systems similar to computing system 300, and include functionality implemented by way of a suitable arrangement of hardware, firmware, and/or software components. In other embodiments, the sender 152 and/or the player 154 may be software modules resident upon other hardware devices (not shown) such as consumer electronics devices (e.g., televisions, audio systems), home devices (e.g., kitchen appliances), or the like.

D. Processes

Figure 4:
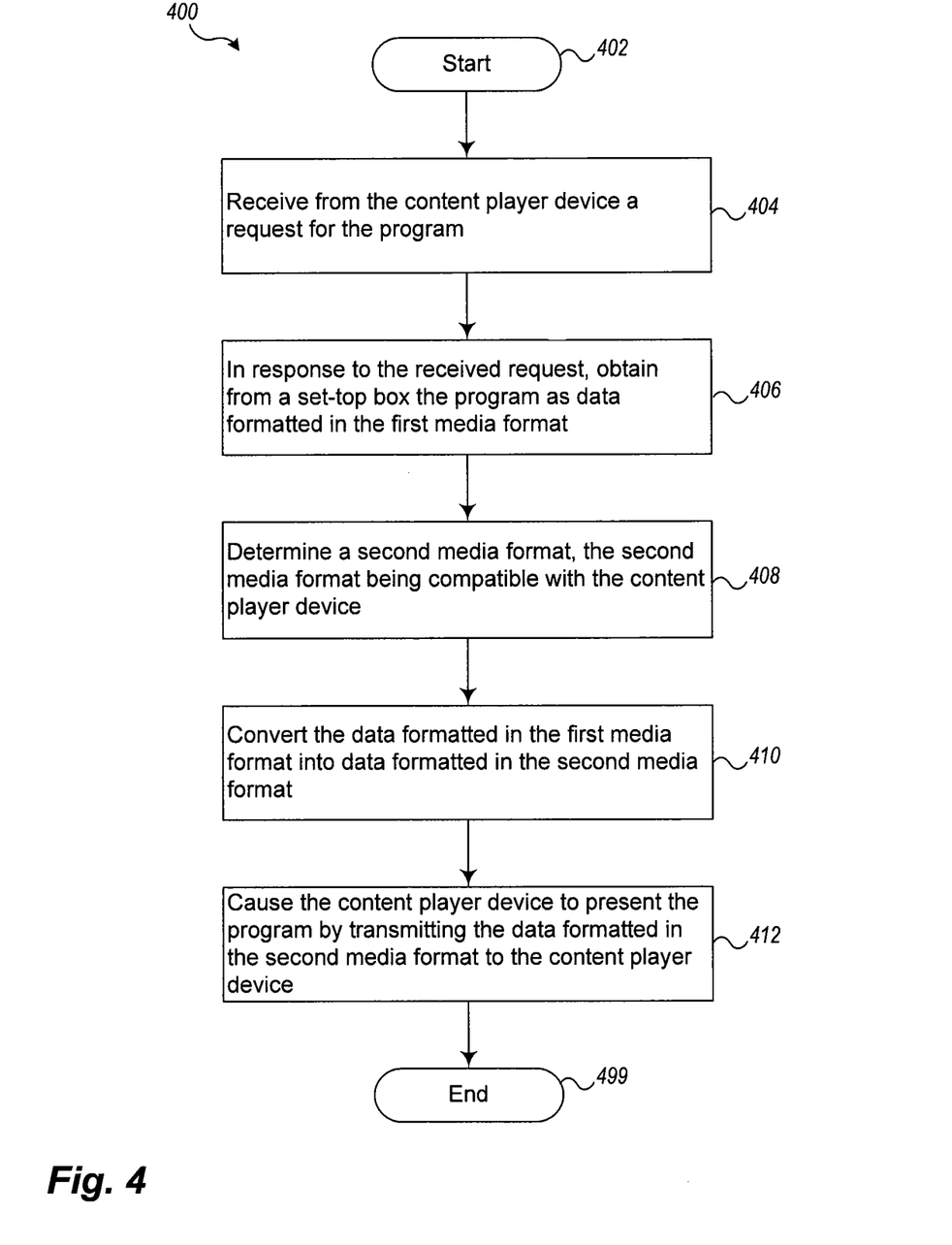
FIG. 4 is a flow diagram of an example content sharing process provided by an example embodiment.

FIG. 4 is a flow diagram of an example content sharing process provided by an example embodiment. In particular, FIG. 4 illustrates process 400 that may be implemented by, for example, one or more elements of the content sharing system 100 as described with respect to FIG. 1A or 1B. The process 400 facilitates content sharing between a receiving device, such as a set-top box and a content player device, the set-top box providing a program as data formatted in a first media format.

The illustrated process 400 starts at 402. At 404, the process receives from a content player device a request for the program. Receiving the request for the program may include receiving the request directly from the content player device. In other embodiments, the request may be received indirectly, such when the request is initially received by a set-top box associated with the content player device, and then forwarded by the set-top box to the media format transcoder.

At 406, the process, in response to the received request, obtains from a set-top box the program as data formatted in the first media format. Obtaining the data may include receiving the data at the media format transcoder, via a network connection between the set-top box and a media content transcoder. The set-top box may obtain the program from various sources, including a broadcast (e.g., cable or satellite) network or a local storage device, such as a hard disk.

At 408, the process determines a second media format, the second media format being compatible with the content player device. Determining the second media format may include receiving from the content player device an indication of the second media format. This indication may be received as part of the request received at 404, as part of a device discovery interaction between the process and the content player device (or some other system), as part of an administrative configuration interaction between the process and a program distributor, or the like.

At 410, the process converts the data formatted in the first media format into data formatted in the second media format. Converting the data may include changing encoding format (e.g., AC3 to MP3), bit rate (e.g., 1.5 Mbits/s to 128 kbits/s), display size (e.g., VGA to XGA), frame/sample rate (30 fps to 15 fps), encoding quality, or the like.

At 412, the process causes the content player device to present the program by transmitting the data formatted in the second media format to the content player device. Transmitting the data may include sending the data via a network connection between the media format transcoder and the content player device. Presenting the program includes displaying or otherwise outputting a rendering of the data formatted in the second media format, such as by providing pixel data to a frame buffer or display device, audio samples to an audio output device, or the like.

At 499, the process ends. In other embodiments, the process may instead continue to one of steps 404-412 in order to facilitate sharing of additional programs.

Some embodiments perform one or more operations/aspects in addition to the ones described with respect to process 400. For example, in one embodiment, process 400 also performs device discovery operations, such as by registering users and/or devices, associating players with senders, or the like.

Figure 5:
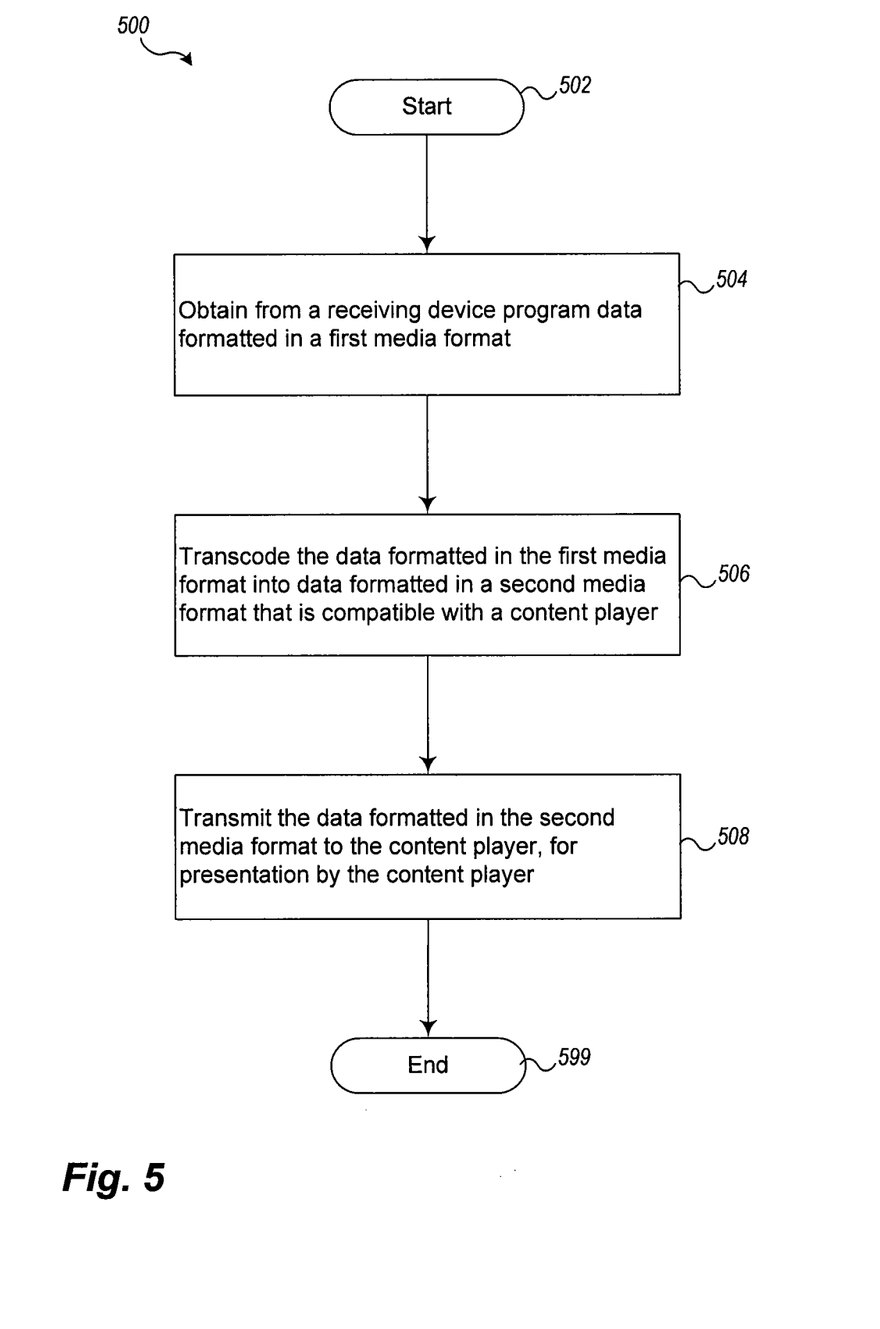
FIG. 5 is a flow diagram of an example media content transcoding process provided by a first example embodiment.

FIG. 5 is a flow diagram of an example media content transcoding process provided by a first example embodiment. In particular, FIG. 5 illustrates process 500 that may be implemented by, for example, one or more modules/components of the media format transcoder 100, as described with respect to FIGS. 1A-1B, 2, and 3. The process 500 facilitates content sharing between a receiving device and a content player, the receiving device providing a program as data formatted in a first media format.

The illustrated process 500 starts at 502. At 504, the process obtains from a receiving device program data formatted in a first media format. Obtaining the data typically includes receiving the data from the receiving device via a network connection. In some embodiments, the data received from the receiving device is in encrypted form. Thus, obtaining the data may also include decrypting the received data, such as by using an authorization key or other identifier associated with the receiving device.

At 506, the process transcodes the data formatted in the first media format into data formatted in a second media format that is compatible with a content player. Transcoding may also include encrypting the data in the second media format in order to restrict access to the content player.

At 508, the process transmits the data formatted in the second media format to the content player, for presentation by the content player.

At 599, the process ends. In other embodiments, the process may instead continue to one of steps 504-508 in order to in order to facilitate sharing of additional programs.

Some embodiments perform one or more operations/aspects in addition to the ones described with respect to process 500. For example, in one embodiment, process 500 determines whether a content player is actually authorized to view a requested program. Such a determination may be made by determining whether the content player is in fact associated with the receiving device, such as because content player provided the appropriate authorization token (e.g., password), the content player is operated by a user who owns or leases the receiving device, or the like. If the content player is not authorized to view the program, then the process may reject the request.

Figure 6:
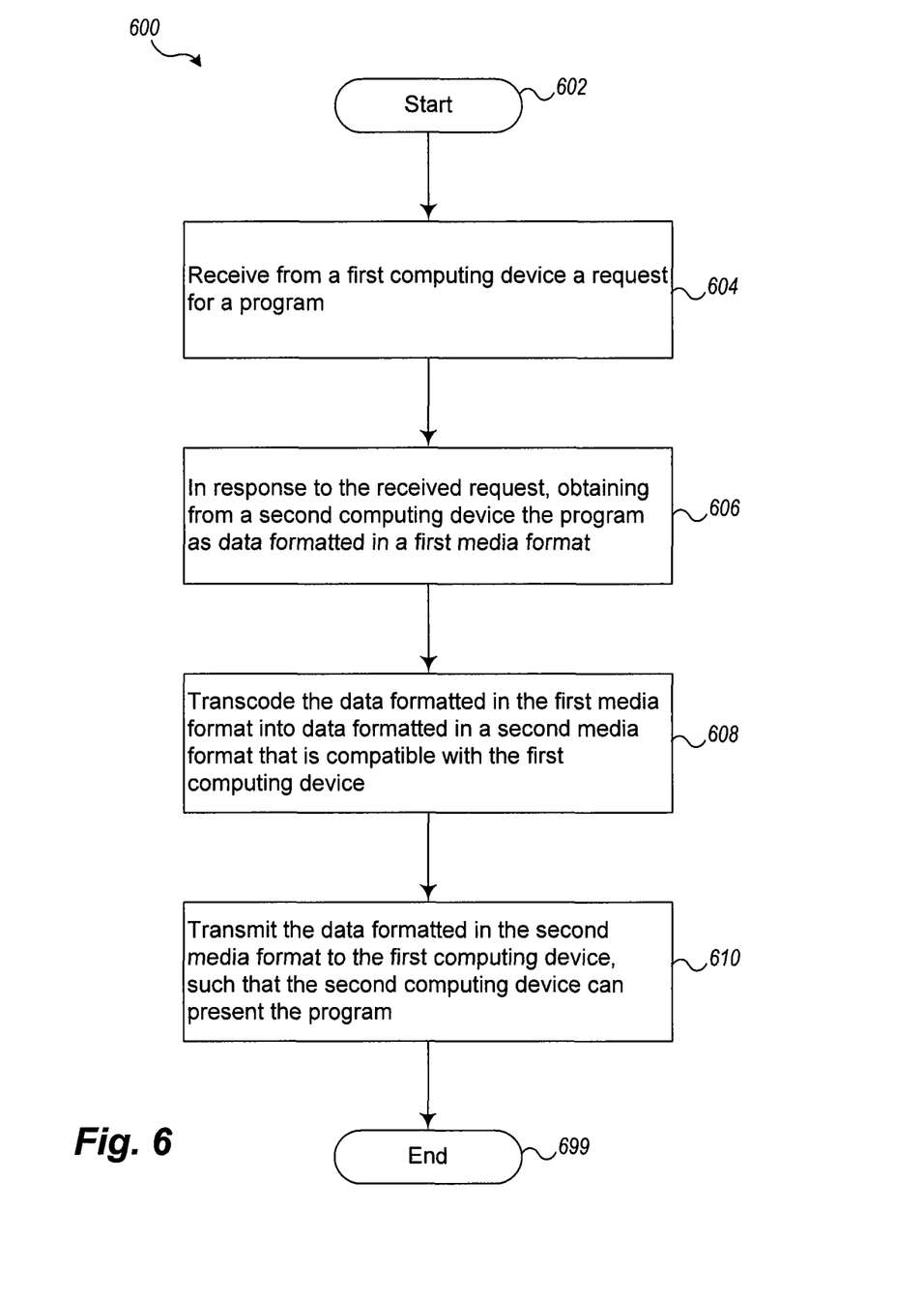
FIG. 6 is a flow diagram of an example media content transcoding process provided by a second example embodiment.

FIG. 6 is a flow diagram of an example media content transcoding process provided by a second example embodiment. In particular, FIG. 6 illustrates process 600 that may be implemented by, for example, one or more modules/components of the media format transcoder 100, as described with respect to FIGS. 1A-1B, 2, and 3. The process 600 facilitates presentation by a first computing device of a program provided by a second computing device, the program stored on the second computing device as data formatted in a first media format.

The illustrated process 600 starts at 602. At 604, the process receives from a first computing device a request for a program. The first computing device may be, for example, a presentation device (e.g., a television) that has been directed (by a user) to display the program.

At 606, the process, in response to the received request, obtains from a second computing device the program as data formatted in a first media format. The second computing device may be, for example, a digital video recorder or home computing system (e.g., a laptop computer) that has stored upon it the program as data in the first media format.

At 608, the process transcodes the data formatted in the first media format into data formatted in a second media format that is compatible with the first computing device. The second media format may be determined based on various factors, including a preferred media format of the first computing device (e.g., a format compatible with audio/video processing software/hardware of the first computing device), network bandwidth (e.g., based on current network utilization, maximum available bandwidth, etc.), computing resources (e.g., based on current CPU load, processor class, etc.), and the like. In some cases, the second media format can be dynamically modified during the transcoding operation. For example, the bit rate of a transcoded video data stream may be reduced in response to reduced network bandwidth.

At 610, the process transmits the data formatted in the second media format to the first computing device, such that the second computing device can present the program.

At 699, the process ends. In other embodiments, the process may instead continue to one of steps 604-610 in order to facilitate sharing of additional programs.

Some embodiments perform one or more operations/aspects in addition to the ones described with respect to process 600. For example, in one embodiment, process 600 operates a media cache, such that in some circumstances the process need not perform the transcoding operation for every requested program. In particular, when the requested program has been previously transcoded into the second media format, the process may provide a cached (e.g., stored) copy of the previously transcoded program.

While various embodiments have been described above, it is to be appreciated that various changes in form and detail may be made without departing from the spirit and scope of the invention(s) presently or hereafter claimed.

The invention claimed is:

1. A content sharing system, comprising:
a media format transcoder configured to facilitate content sharing between a set-top box and a content player device, the set-top box providing a program as data formatted in a first media format, the set-top box and the content player device each situated remotely from the media format transcoder, by:
receiving from the set-top box a request for the program, the request originating from the player device and received from the set-top box via a network interface of the media format transcoder to a network external to the transcoder on which the transcoder, set-top box, and content player are each connected and over which the set-top box and content player device are configured to communicate with the transcoder;
in response to the received request, dynamically obtaining from the set-top box, as the program is being received by the set-top box from a broadcast network, the program as data formatted in the first media format, wherein the data formatted in the first media format that is obtained as the program is being received by the set-top box from the broadcast network is obtained via the same network interface of the media format transcoder to the same network external to the transcoder as that via which the request for the program was received from the content player device;
determining a second media format, the second media format being compatible with the content player device;
converting the data formatted in the first media format into data formatted in the second media format; and
causing the content player device to present the program by transmitting the data formatted in the second media format to the content player device as the program is being received by the set-top box from the broadcast network, wherein the data formatted in the second media format that is transmitted to the content player device as the program is being received by the set-top box from the broadcast network is transmitted via the same network interface of the transcoder to the same network external to the transcoder as that via which the request for the program was received from the content player device.

2. The content sharing system of claim 1, further comprising the set-top box, wherein the set-top box is communicatively coupled to the media format transcoder and authorized to present the program on a presentation device, and wherein the set-top box is configured to:
receive from the broadcast network the program as data formatted in the first media format; and
transmit to the media format transcoder the data formatted in the first media format dynamically as the program is being received by the set-top box from the broadcast network.

3. The content sharing system of claim 1, further comprising the content player device, wherein the content player device is communicatively coupled to the media format transcoder, and wherein the content player device is configured to:
 transmit the request for the program to the set-top box;
 receive from the media format transcoder the data formatted in the second media format; and
 present the program on a display device.

4. The system of claim 3, wherein the content player device is further configured to display program data formatted in one or more media formats.

5. The system of claim 4, wherein the determining the second media format is based on an identifier of the content player device and on the one or more media formats.

6. The system of claim 5, wherein the one or more media formats includes one or more of: MPEG-1, MPEG-2, MPEG-4, Flash, QuickTime, Windows Media, AVI, 3GP, H.261, H.263, and H.264.

7. The content sharing system of claim 1 further comprising a server computing system that is remote from both the content player device and the set-top box, wherein the media format transcoder executes upon the server computing system and is further configured to convert between media formats including at least two of MPEG-1, MPEG-2, MPEG-4, Flash, QuickTime, Windows Media, AVI, 3GP, H.261, H.263, and H.264.

8. The system of claim 7 wherein the converting the data formatted in the first media format includes transcoding the data formatted in the first media format based at least in part on available network bandwidth between the server computing system and the content player device.

9. The system of claim 1, wherein obtaining the program as data formatted in the first media format includes:
 receiving from the set-top box an encrypted form of the data formatted in the first media format; and
 decrypting the encrypted form of the data formatted in the first media format.

10. The system of claim 1, wherein the media format transcoder is further configured to facilitate content sharing between the set-top box and the content player device by:
 determining whether the content player device is authorized to display the program.

11. The system of claim 1, wherein the obtaining from the set-top box the program as data formatted in the first media format includes obtaining the data formatted in the first media format from a data repository of the set-top box, the data repository configured to store programs received by the set-top box from a broadcast network.

12. The system of claim 1, wherein the media format transcoder is further configured to facilitate content sharing between the set-top box and the content player device by:
 determining network bandwidth available to the content player device; and
 determining the second media format based at least in part on the determined network bandwidth available to the content player device.

13. The system of claim 1, wherein the media format transcoder is further configured to facilitate content sharing between the set-top box and the content player device by:
 registering the content player device by storing an association of an identifier of the content player device with an identifier of the set-top box, the stored association indicating that the content player device is authorized to present programs provided by the set-top box.

14. The system of claim 1, wherein converting the data formatted in the first media format into data formatted in the second media format, includes transcoding data in a first audio/video format into data in a second audio/video format.

15. The system of claim 1, wherein the content player device and the set-top box are located at a common location.

16. The system of claim 1, wherein the media format transcoder is further configured to:
 store data formatted in the second media format;
 receive from a device other than the content player device a request for the program; and
 in response to the received request from the device other than the content player device, transmit the data formatted in the second media format.

17. A method in a media transcoder, comprising:
 facilitating content sharing between a receiving device and a content player, the receiving device providing a program as data formatted in a first media format, by:
  receiving from the receiving device a request for the program, the request originating from the content player;
  in response to receiving from the receiving device the request for the program, obtaining from the receiving device the data formatted in the first media format, wherein the data formatted in the first media format is obtained as the program is being received by a set-top box from a broadcast network and is obtained via a same network interface of the media format transcoder to a same network external to the transcoder as that via which a request for the program had been received from the content player device;
  transcoding the data formatted in the first media format into data formatted in a second media format that is compatible with the content player; and
  transmitting the data formatted in the second media format to the content player, for presentation by the content player, as the program is being received by the set-top box from the broadcast network, wherein the data formatted in the second media format that is transmitted to the content player device as the program is being received by the set-top box from the broadcast network is transmitted via the same network interface of the transcoder to the same network external to the transcoder as that via which the request for the program was received from the content player device.

18. The method of claim 17, wherein obtaining the data formatted in the first media format includes:
 receiving from the receiving device an encrypted form of the data formatted in the first media format; and
 decrypting the encrypted form of the data formatted in the first media format.

19. The method of claim 17, wherein the content player is operable to display program data formatted in one or more media formats, and further comprising:
 determining the second media format based on an identifier of the content player and on the one or more media formats.

20. The method of claim 17 wherein transcoding the data formatted in the first media format into data formatted in a second media format includes transcoding data formatted in at least one of MPEG-1, MPEG-2, MPEG-4, Flash, QuickTime, Windows Media, AVI, 3GP, H.261, H.263, and H.264.

21. The method of claim 17, further comprising:
 determining whether the content player is authorized to display the program.

22. The method of claim 17 wherein obtaining the data formatted in the first media format includes obtaining the data formatted in the first media format from a data repository of the receiving device, the data repository storing programs received by the receiving device from a broadcast network.

23. A method in a media transcoder, comprising:
   facilitating presentation by a first computing device of a program provided by a second computing device, the program stored on the second computing device as data formatted in a first media format, by:
      receiving from the second computing device a request for the program, the request originating from the first computing device;
      in response to the received request, obtaining from the second computing device, as the program is being received by the second computing device at a customer premises from a broadcast network, the program as the data formatted in the first media format;
      transcoding the data formatted in the first media format into data formatted in a second media format that is compatible with the first computing device; and
      transmitting the data formatted in the second media format to the first computing device, such that the first computing device can present the program.

24. The method of claim 23, further comprising:
   determining network bandwidth available to the first computing device;
   determining the second media format based at least in part on the determined network bandwidth available to the first computing device.

25. The method of claim 23, further comprising:
   registering the first computing device by storing an association of an identifier of the first computing device with an identifier of the second computing device, the stored association indicating that the first computing device is authorized to present programs provided by the second computing device.

26. The method of claim 23 wherein facilitating presentation by the first computing device of the program provided by the second computing device includes facilitating presentation by the first computing device of a program received by a receiving device from a broadcast network.

27. The method of claim 23 wherein facilitating presentation by the first computing device of the program provided by the second computing device includes facilitating presentation by a first consumer electronics device of a program stored by a second consumer electronics device.

28. The method of claim 23 wherein transcoding the data formatted in the first media format into data formatted in a second media format, includes transcoding data in a first audio/video format into data in a second audio/video format.

29. The method of claim 23 wherein a transcoding server is remotely located from the first and second computing devices, and wherein transcoding the data includes transcoding the data based at least in part on available network bandwidth between the transcoding server and the first computing device.

30. The method of claim 29, wherein the first and second computing devices are consumer electronics devices located at a common location.

31. The method of claim 23, further comprising:
   storing data formatted in the second media format;
   receiving from a third computing device a request for the program; and
   in response to the received request from the third computing device, transmitting the data formatted in the second media format.

* * * * *